No. 660,119. Patented Oct. 23, 1900.
J. H. McGURTY.
ALARM APPARATUS FOR REFRIGERATOR PANS.
(Application filed June 14, 1900.)
(No Model.)
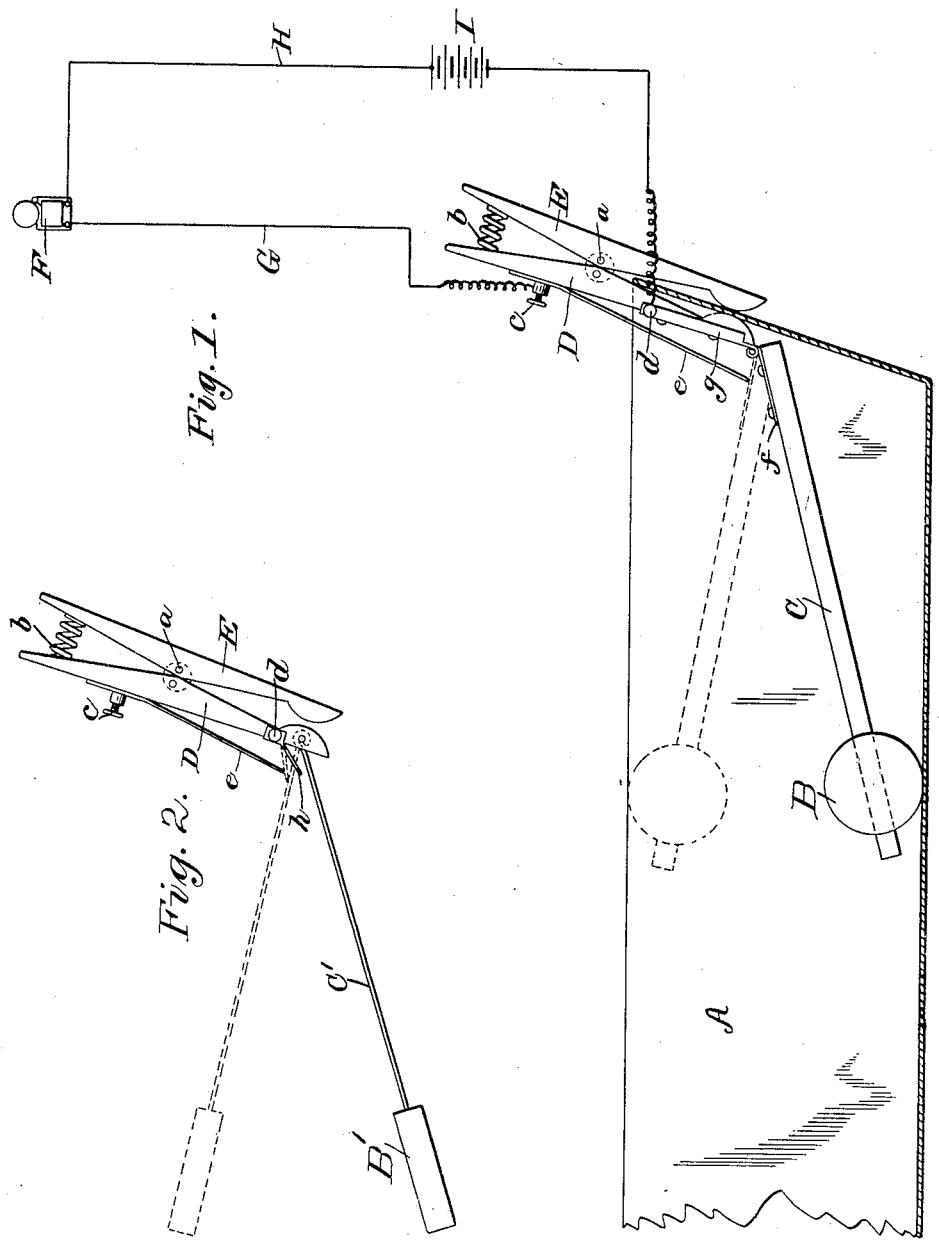
WITNESSES
INVENTOR
James H. McGurty
ATTY

UNITED STATES PATENT OFFICE.

JAMES H. McGURTY, OF JERSEY CITY, NEW JERSEY.

ALARM APPLIANCE FOR REFRIGERATOR-PANS.

SPECIFICATION forming part of Letters Patent No. 660,119, dated October 23, 1900.

Application filed June 14, 1900. Serial No. 20,269. (No model.)

*To all whom it may concern:*

Be it known that I, JAMES H. McGURTY, a citizen of the United States, residing at Jersey City, in the county of Hudson and State of New Jersey, have invented certain new and useful Improvements in Alarm Appliances for Refrigerator-Pans; and I do hereby declare the following to be a full, clear, and exact description of the invention, such as will enable others skilled in the art to which it appertains to make and use the same.

My invention has relation to appliances especially designed for use in connection with refrigerator-pans for the purpose of causing an alarm to be sounded when the water in the pan has reached a certain height, (indicating that the pan should then be emptied.)

The object of my invention is to provide or produce an alarm appliance for use in the situation above named, which appliance shall be cheap and easy to construct, reliable in action, easy to be applied to the pan and to be detached therefrom, and which shall be compact, durable, and not liable to get out of order. To accomplish all of this and to secure other and further advantages in the matters of construction, operation, and use, my improvements involve certain new and useful arrangements or combinations of parts and particular features of construction, as will be hereinafter first fully described and then pointed out in the claims.

In the accompanying drawings, forming part of this specification, Figure 1 is a vertical view illustrating my improved alarm appliance in place upon the wall of a refrigerator-pan, of which only a fragment is shown, the alarm being represented as operated by electricity, as is preferred. Fig. 2 is a vertical view of the appliance detached, omitting the battery and bell, and showing a slightly-modified means of closing the circuit by the movable arm which carries the float.

In both the figures like letters of reference, wherever they occur, indicate corresponding parts.

A represents any refrigerator-pan, and B a float of any suitable character calculated to rise with the water as it slowly drips into the pan. The float B is carried by and may be adjustable upon an arm C, suitably hinged to one member of the clamp by which the appliance is connected with or mounted upon the wall of the pan. In the form shown the clamp is composed of two members D and E, hinged one to the other, as at *a*, and supplied with a spring, as *b*, which normally forces the ends of the two members to bear upon the wall of the pan with force sufficient to hold the appliance in proper place until purposely detached. By compressing the upper ends of the clamp members against the action of the spring the lower ends are freed and the appliance easily removed, to be as easily replaced after the pan has been emptied.

F represents a bell intended to be sounded as soon as the float reaches a certain height in the pan. It is preferred that the float-carrying arm shall cause an electric circuit to be closed at the proper instant in order to accomplish the ringing of the bell F, and for this purpose the conductors G and H are led from the bell and battery I to suitable binding-posts, as *c* and *d*, upon member D, the two posts being insulated from each other. From the post *c* a metallic plate or strip *e* extends out to a position where it can be reached by the float-arm in its highest position, but will be free of that arm when the arm is lowered. In the form shown in Fig. 1 the arm C is hinged to member D by a simple metallic strap-hinge, as *f*, and this is connected with post *d* by a side plate, as *g*, or otherwise, as may be desired. Under this arrangement when float B rises far enough the hinge-plate *f* will be brought into contact with the end of strip *e*, thereby closing the electric circuit and causing the alarm to be sounded. The alarm will continue until the appliance receives the required attention.

When the battery and bell are purposely furnished with the appliance, they may be of any suitable character and need not be large or expensive, but are preferably made as small and compact as circumstances will warrant. The ordinary dry battery will be useful in this connection. Where a house-bell service is already installed, the appliance may be connected with that service in a manner easily understood and the house-bell utilized to sound the required alarm.

In Fig. 2 the float B' is carried by arm C', which is hinged to member D and arranged to strike against a separate contact-piece, as

*h*, and to force the latter against the end of plate *e* to complete the circuit. The piece *h* is merely a light piece of spring metal connected with post *d*. This obviates the use of strap-hinge *f* and is a simpler and cheaper construction, though in operation practically the same as that of Fig. 1.

Obviously the hinged float-arm might be arranged to trip any form of alarm the same as it is arranged to close an electric circuit, in which case the battery would be unnecessary.

The improved appliance answers all the purposes or objects of the invention previously set forth. It serves to attract the timely attention of the attendant, and thus insures the emptying of the pan before overflow, to manifest advantages of the householder.

Having now fully described my invention, what I claim as new herein, and desire to secure by Letters Patent, is—

1. In an alarm appliance for refrigerator-pans, the combination with the pan of a detachable clamp composed of two members hinged together and having an intervening spring, a float-arm hinged to said clamp, two metallic plates on the clamp, and an electric alarm arranged to be sounded upon the rise of the float-arm which carries one of the said plates into contact with the other, substantially as and for the purposes explained.

2. In an alarm appliance for refrigerator-pans, the combination with the pan of a detachable clamp, a float-arm hinged to said clamp, two metallic plates on the clamp, and an electric alarm arranged to be sounded upon the rise of the float-arm, the conductors being connected with the metallic plates, one of which plates is brought into contact with the other by the float-arm, substantially as shown and described.

3. In an alarm appliance for refrigerator-pans, the combination with the pan of the clamp composed of two members hinged together and having an intervening spring, the binding-posts for the electric conductors applied upon one of the members of the clamp, the contacting pieces connected with said posts, and the float-arm hinged to the clamp and arranged to operate substantially in the manner and for the purposes set forth.

In testimony whereof I have affixed my signature in presence of two witnesses.

JAMES H. McGURTY.

Witnesses:
C. SEDGWICK,
WORTH OSGOOD.